US009832206B2

(12) United States Patent
Mare et al.

(10) Patent No.: US 9,832,206 B2
(45) Date of Patent: Nov. 28, 2017

(54) SYSTEM, METHOD AND AUTHORIZATION DEVICE FOR BIOMETRIC ACCESS CONTROL TO DIGITAL DEVICES

(71) Applicant: The Trustees of Dartmouth College, Hanover, NH (US)

(72) Inventors: Shrirang Mare, West Lebanon, NH (US); Andres Molina-Markham, Woburn, MA (US); Ronald Peterson, Brattleboro, VT (US); David Kotz, Lyme, NH (US)

(73) Assignee: THE TRUSTEES OF DARTMOUTH COLLEGE, Hanover, NH (US)

( * ) Notice: Subject to any disclaimer, the term of this patent is extended or adjusted under 35 U.S.C. 154(b) by 77 days.

(21) Appl. No.: 14/778,839

(22) PCT Filed: Mar. 21, 2014

(86) PCT No.: PCT/US2014/031484
§ 371 (c)(1),
(2) Date: Sep. 21, 2015

(87) PCT Pub. No.: WO2014/153528
PCT Pub. Date: Sep. 25, 2014

(65) Prior Publication Data
US 2016/0050217 A1   Feb. 18, 2016

Related U.S. Application Data

(60) Provisional application No. 61/804,140, filed on Mar. 21, 2013.

(51) Int. Cl.
*H04L 29/06* (2006.01)
*H04L 9/32* (2006.01)
(Continued)

(52) U.S. Cl.
CPC ............ *H04L 63/12* (2013.01); *H04L 9/3215* (2013.01); *H04L 63/08* (2013.01); *H04W 12/06* (2013.01);
(Continued)

(58) Field of Classification Search
CPC ........ H04L 63/12; H04L 63/08; H04W 88/02; H04W 12/06
See application file for complete search history.

(56) References Cited

U.S. PATENT DOCUMENTS

2001/0047488 A1* 11/2001 Verplaetse .............. G06F 21/32
726/5
2003/0103414 A1   6/2003 Lyon
(Continued)

OTHER PUBLICATIONS

Ojala et al., Wearable authentication device for transparent login in nomadic applications environment, Nov. 2008, 2nd International Conference on Signals, Circuits and Systems, pp. 1-6.*
(Continued)

*Primary Examiner* — Kenneth Chang
(74) *Attorney, Agent, or Firm* — Lathrop Gage LLP

(57) ABSTRACT

A system and method for authenticating and continuously verifying authorized users of a digital device includes an authentication device attached to an arm or wrist of authorized users. The authentication device has an accelerometer, digital radio, a processor configured to provide identity information over the radio, and to transmit motion data. The motion data is received by the digital device and the identity transmitted is verified as an identity associated with an authorized user. Input at a touchscreen, touchpad, mouse, trackball, or keyboard of the digital device is detected, and correlated with the motion data. Access to the digital device is allowed if the detected input and the detected motion data correlate, and disallowed otherwise.

16 Claims, 6 Drawing Sheets

(51) Int. Cl.
*H04W 12/06* (2009.01)
*H04W 88/02* (2009.01)

(52) U.S. Cl.
CPC ......... *H04L 63/0853* (2013.01); *H04W 88/02* (2013.01)

(56) References Cited

U.S. PATENT DOCUMENTS

| | | | |
|---|---|---|---|
| 2007/0177770 A1 | 8/2007 | Derchak et al. | |
| 2008/0020733 A1* | 1/2008 | Wassingbo | G06F 3/017 455/411 |
| 2008/0170776 A1* | 7/2008 | Albertson | G06F 21/35 382/154 |
| 2009/0083850 A1* | 3/2009 | Fadell | G06F 21/316 726/19 |
| 2009/0284482 A1* | 11/2009 | Chin | G06F 3/04883 345/173 |
| 2010/0096452 A1* | 4/2010 | Habraken | G06Q 20/327 235/382 |
| 2010/0156676 A1* | 6/2010 | Mooring | G06F 3/017 341/20 |
| 2011/0219427 A1* | 9/2011 | Hito | G06F 21/00 726/3 |
| 2012/0314090 A1* | 12/2012 | Jallow | H04W 4/008 348/207.1 |
| 2012/0317024 A1 | 12/2012 | Rahman et al. | |
| 2013/0027341 A1 | 1/2013 | Mastandrea | |
| 2014/0300490 A1* | 10/2014 | Kotz | A61B 5/0028 340/870.3 |

OTHER PUBLICATIONS

PCT Patent Application PCT/US2014/031484 International Search Report and Written Opinion dated Sep. 4, 2014, 19 pages.

* cited by examiner

Access Control Bracelet

Linked Digital Device

Security Station

SYSTEM, METHOD AND AUTHORIZATION DEVICE FOR BIOMETRIC ACCESS CONTROL TO DIGITAL DEVICES

PRIORITY CLAIM AND RELATED APPLICATIONS

The present application claims priority from U.S. Provisional Patent Application 61/804,140, filed 21 Mar. 2013, the contents of which are incorporated herein by reference. The present application also is related to United States PCT application No. PCT/US12/71566 filed Dec. 24, 2012, the contents of which are incorporated herein by reference. In particular, some of the biometric user-identification techniques, such as vocal resonance and bioimpedance, from the PCT application may be useful in embodiments of the invention described herein.

GOVERNMENT INTEREST

The work described herein has been supported by National Science Foundation grant numbers 0910842 and 1329686, and by the United States Department of Health and Human Services Office of National Coordinator for Health Information Technology grant number 90TR0003-01. The Government has certain rights in the invention.

FIELD

The present document relates to the field of secure access to digital devices in a multiuser environment.

BACKGROUND

There are multiple-user, secure-access applications where electronic devices may be accessible to, and used by, multiple authorized users, but where access must be distinguished for each user. An example of a multiple-user, secure-access, system is a computer terminal in a patient room at a hospital, which may be used by multiple users of multiple categories and authorization levels such as LPNs, RNs, therapists, medical students, and physicians to access and update electronic medical records, but should remain secure from unauthorized users such as hospital visitors. Each category of user may be authorized to access different portions of a medical record and have different levels of authorized access; for example an LPN may be able to read, but not alter, medical orders such as prescription dosage and drug information or dietary restrictions, while being able to enter dates and times each drug was administered to a patient, while a physician is authorized to add and change medical orders including dosages and drugs. It is often desirable to track and log entries according to user; for example, recording the identity of a physician who enters a medical order. In a typical hospital, many multiple-user, secure-access systems are multiple access-point systems, where each individual user may need to access the system from more than one physical location throughout a workday; for example an RN with supervisory responsibility may need to access electronic records through any terminal in an entire emergency-room department.

User logging and user-specific authorization are of use in other fields besides electronic health records. For example, it can be desirable to compartmentalize secret information in a military intelligence or planning environment, or even some industrial research environments, authorizing access to certain data by only particular persons, and other data to other persons, regardless of the terminal or other digital device used to access the data. In order to comply with safety rules, in some industrial and academic laboratory settings it may be desirable to limit access to certain machines to those who have received training specifically for those machines. The wristband herein described may also be used to enable and track usage of copiers, and to unlock security doors only for those having authorized access to certain areas or supply cabinets. Developers of large computer programs also may find it desirable to track access to source code, and to limit write access of specific programmers to those portions of the source code for which they are responsible.

Users who must access or share multiple devices throughout a workday tend to use short, insecure, quickly-entered passwords. They also tend to fail to log out at the end of an interaction with a system, and to use terminals that may still be logged in under another user's identity; occurrences that tend to evade user-specific access and usage restrictions.

SUMMARY

A system and method for authenticating and continuously verifying authorized users of a digital device includes an authentication device attached to an arm or wrist of authorized users. The authentication device has an accelerometer, digital radio, a processor configured to provide authentication device identity information over the radio, and the capability to transmit encrypted motion data. The digital device receives the motion data and the transmitted identity is verified as an identity associated with an authorized user. Input at a touchscreen, touchpad, mouse, trackball, or keyboard of the digital device is detected, and correlated with the encrypted motion data. Access to the digital device is allowed if the detected input and the detected motion data correlate, and disallowed otherwise. The digital device may be a part of a larger system having multiple workstations, such as a medical records database system.

A system designated includes an authentication device adapted to be attached to an arm or wrist of an authorized user, the authentication device including at least one accelerometer; a digital radio; and a processor configured to provide authentication device identity information over the digital radio, and to transmit motion data comprising data selected from the group consisting of data including readings from the at least one accelerometer, and motion characteristic data derived from readings from the at least one accelerometer. The system also includes a digital device including a digital radio adapted to communicate with the digital radio of the authentication device; at least one input device selected from the group consisting of a touchscreen, a touchpad, a mouse, a trackball, and a keyboard, the input device adapted to record an input entered by a user; and at least one processor and at least one memory. The memory includes firmware comprising machine readable instructions adapted to correlate motion data received by the digital radio of the digital device from the authentication device with recorded input entered by the user, and to disallow access to the digital device if correlation fails.

DETAILED DESCRIPTION OF THE EMBODIMENTS

The term "digital device" refers herein to a tablet, smartphone, laptop, desktop, or another computer system that can recognize gesture or tap interactions whether through a touchscreen, touchpad, keyboard, mouse, trackball, or other input apparatus. Multiple digital devices and multiple authorized users are assumed to exist in an environment. In some embodiments, the environment is a space where proximity-based solutions are impractical due to occasional presence of multiple authorized users in the vicinity of a digital device, such that proximity of a radio tag or badge alone may not be a sufficient criteria for allowing access to a correctly and unambiguously identified a particular user. An example of such an environment is a trauma bay in a hospital emergency room where many residents, surgeons, and nurses may be working on a freshly-arrived patient.

Figure 1:
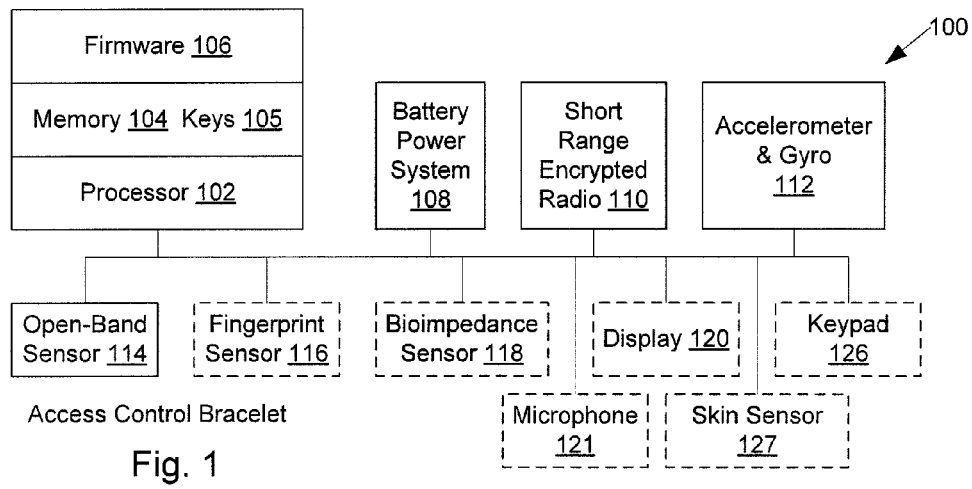
FIG. 1 is a block diagram of an access control bracelet.
Figure 1A:
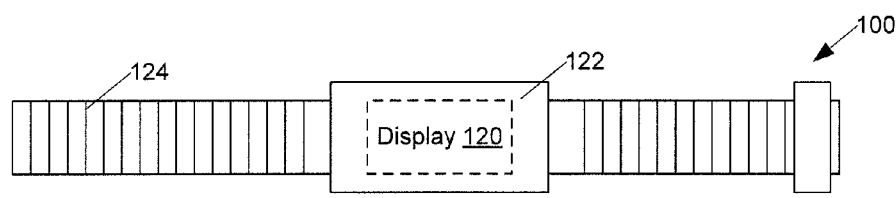
FIG. 1A is a top view of an exemplary access control bracelet.

In a system for tracking access to, and allowing user-specific levels of access to digital devices, while securing the digital devices from unauthorized users, each authorized individual wears an access-control armband or wrist bracelet (bracelet) on his dominant arm or wrist—preferably the arm or wrist of the hand primarily used to interact with digital devices. The bracelet 100 (FIGS. 1 and 1A) has a processor 102 with associated memory 104 containing firmware 106 with security protocols, a battery power system 108, which in an embodiment includes a rechargeable battery, low voltage detector, and an inductive charge-coupling coil for recharging the battery when the bracelet 100 is in a bracelet storage and security station. The bracelet also has a digital radio 110 adapted for encrypted communication of access-related information with digital devices, and at least one accelerometer 112 adapted to detect and measure movements of any arm to which the bracelet is attached. The bracelet has an open-band sensor 114, and in various embodiments may have one or more additional biometric-measurement devices, such as a fingerprint sensor 116, or bioimpedance sensor 118, built into it. In another embodiment the bracelet is stored and recharged at a security station having additional biometric-measurement devices. In some embodiments the bracelet has a display 120 useful for indicating state of charge, authorization state, and in some embodiments providing additional information such as the current time so that the bracelet may serve as a wristwatch. Most electronic components, including display 120, are included in a bracelet body 122 that may be attached by an adjustable band 124 to a wrist or arm of a user (not shown).

The bracelet may have an optional keypad 126 for entry of a personal identification number or other authorization inputs, and may also have a skin sensor 127, such as a skin capacitance sensor, for biometrically distinguishing between a state where it is in contact with a user's arm state and a state where it has been removed from a user's arm.

In an embodiment, the bracelet transmits an encrypted identifying code, or authentication device identity, to a receiver 160 located at or near a digital device, such as device 150 (FIG. 2), and, under direction of firmware 106, collects accelerometer readings from accelerometer 112, and gyroscope readings in embodiments having a gyroscope as well as an accelerometer, when motion is sensed and transmits those readings, or data derived from those readings, to the digital device when motion is sensed. The bracelet and the at least one digital device, or a system having common access-control files or keys 105, 155, are already paired—having shared encryption algorithms and keys for secure communications between the device or system and the bracelet. There may be more than one digital device having common keys.

The digital device 150 is assumed to have a processor 152, memory 154, and software or firmware 156 that provides machine readable instructions for security access protocols as described below. The digital device typically also has a display 162 and at least one input device 164 such as a mouse, touchscreen, touchpad, keyboard, or trackball, or other manually-manipulated digital input device. The digital device either has an access-control database 166 so it can recognize an authorized bracelet, or has a longer-range wireless network radio 168 or hardwired network connection (not shown) through which it can access an access-control database 172 located on server 170.

Figure 1B:
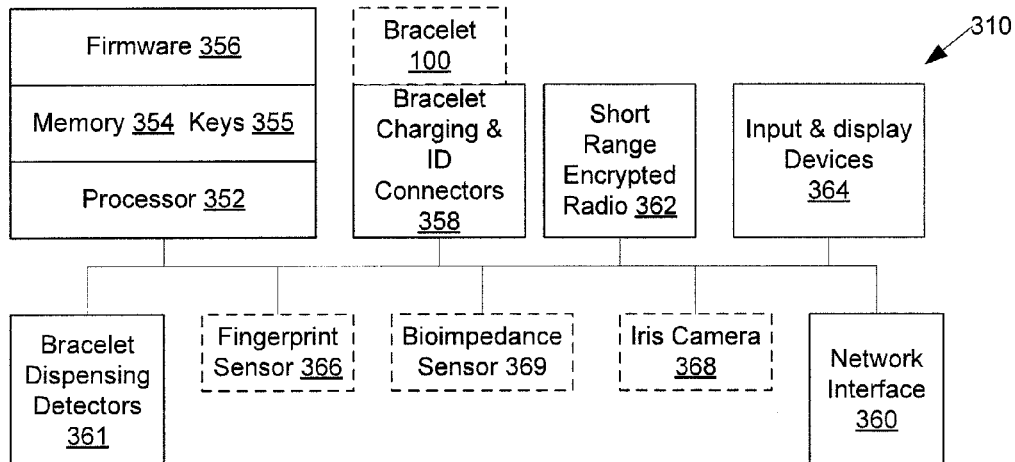
FIG. 1B is a block diagram of a security station adapted to dispensing, recharging, and authorizing the access control bracelet of FIGS. 1 and 1A.

A security station 310 (FIG. 1B) for use in a system 300 with bracelets 100 has a processor 352 with a memory 354 containing machine-readable instructions 356 (firmware) for directing its operation, and security keys for encrypted communications with bracelets 100. The processor 352 is coupled to network interface 360 for communications with a server, such as server 302, on which an access and security database 304 is located. The security station has charging connectors 358 or inductive couplings for charging bracelets, and detectors 361 for determining when a bracelet is removed from the station, and a short-range radio 362 for communicating with, and configuring, bracelets. When a user desires to interact with devices 312, 314, 318 (FIG. 3) of the system, that user is identified by the security station through entry of a username and password through input devices and display 364, by swiping a finger over a fingerprint sensor 366, or by exposing an eye to iris camera 368 and recognition system, or in another secure way. Once the user is identified, the user removes a bracelet 100 from security system 300, security system 300 identifies the removed bracelet with dispensing detectors 361 and records the user identification and bracelet identification in the access and security database 304 on server 302. In an alternative embodiment, security system 300 radios user identification codes to bracelet 100 using encrypted radio 362.

Basic Operation with Digital Devices

Each bracelet is keyed 202 (FIG. 4) by a security station to, or identifies through its optional biometric sensor 116, 118, a unique authorized user. Individuals are not permitted to share their activated bracelets. In some embodiments, the bracelet is activated, and keyed to an individual user, by entering a personal identification number into the bracelet through the optional keypad 126 when he puts the bracelet on, or into a keypad at a security station when he removes the bracelet from storage in the security station, and the bracelet deactivates when the device is opened for removal, or after a period of predetermined time. In some embodiments, the authorized user is associated with an authorized-user record in an access control database 172 (FIG. 2) on a server, and a bracelet identification code unique to each bracelet is stored in the authorized-user record when the bracelet is keyed to the individual user. There may also be a local access-control database 166, which may include a copy of portions of access control database 172. The access control database may be a part of an access and security database 304 (FIG. 3), and in some embodiments also contains user identification and password information as well as privilege levels.

In another embodiment, the bracelet has a biometric device such as a microphone 121 for monitoring vocal resonance as a user speaks, a bioimpedance 118 measuring device, or a fingerprint sensor 116 for confirming identity of the user wearing it. In an alternative embodiment the bracelet-issuing security station has a biometric measurement device such as fingerprint sensor 366, a bioimpedance sensor 369, or an iris-scanning camera 368, such that each user's identity is positively identified or confirmed at bracelet issuance by comparing biometric information read by the biometric measurement device against user-identifying data in a database of authorized users prior to activating the bracelet. In an embodiment, the bracelet uses the bioimpedance sensor, or in an alternative embodiment a passive capacitance sampling sensor, not merely to confirm identity of a wearer, but to confirm that it has been closed about a limb of a wearer and not simply closed and dropped in a pocket.

In some implementations, an impedance measurement takes about 98 mW of power to measure for the duration of the measurement. In an alternative embodiment, passive capacitive sensing techniques are used to determine that the bracelet is attached to a user. Because these latter techniques require very little power, then can be run continuously to determine that a limb is within the bracelet. Such a signal can even be used to wake up the bracelet so that energy can be conserved in the cases when there is no contact.

Once a user is issued a bracelet, and the bracelet is activated and keyed to the user, each digital device is accessed through password-less access control. In a low security embodiment, the bracelet lacks a biosensor and open-band sensor 114, and may be freely removed and re-worn by the user. In a higher security embodiment, should the user remove the device, opening is detected by open-band sensor 114 and the bracelet is deactivated. Should the bracelet open-band sensor detect re-closure of the band, the bracelet remains inactive until it first uses its built-in sensors to verify that it is once again being worn by a wearer, and reconfirms identity of the wearer through the security station, through login with other identifying information of a wearer or user at a digital device of the system, or through in-built sensors. In an embodiment, the bracelet uses an internal biosensor to measure bioimpedance of the wearer's wrist, and comparing those bioimpedance readings to expected ranges of bioimpedance for human wearers, to verify that it is being worn. In an alternative embodiment, passive capacitive sensing is used to verify that it is being worn. In a particular embodiment, passive capacitive sensing is run continuously and the open-band sensor may be omitted.

Figure 2:
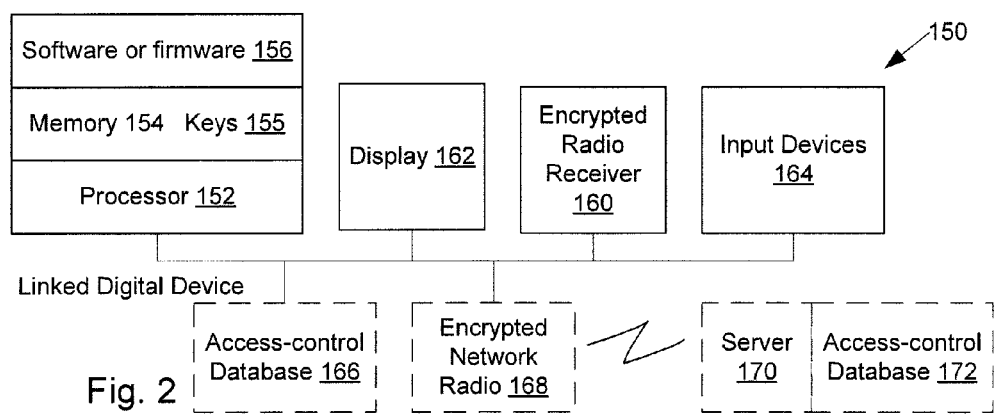
FIG. 2 is a block diagram of a digital device having access secured by an access control bracelet.
Figure 3:
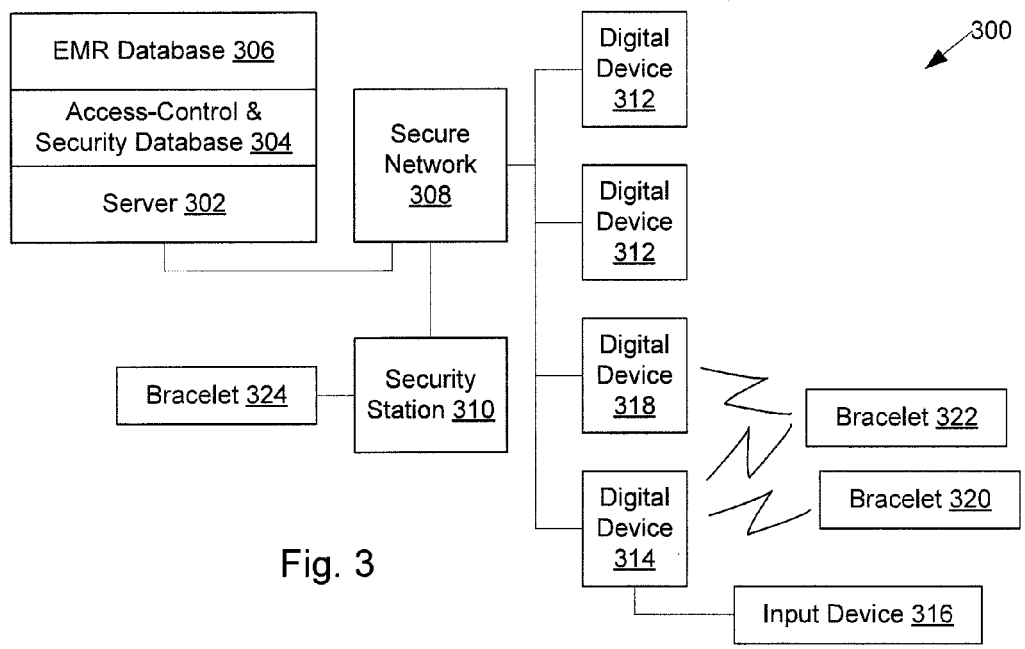
FIG. 3 is a block diagram of a multiple-access-point system having access secured by access control bracelets.

The password-less access control begins with establishing communications 204 between the encrypted radio receiver 160 of the device and the encrypted radio 110 of bracelets in range. Bracelets keyed to authorized users of that particular digital device as illustrated in FIG. 2, or to all digital devices of a multiple device system such as that of FIG. 3, are recognized, while any inactive or unauthorized bracelets in the vicinity are ignored.

A user wearing a bracelet approaches the device with intent to use it. The device determines a particular bracelet associated with a particular user attempting to use the device.

In an embodiment, determination of a particular user from potential users in range is performed by having the digital device display 206 an initial screen that lists authorized users associated with bracelets in range, and the user selects 208 himself from the list. A second screen is displayed 210 having a shape, such as a triangle or polygon, that the user is expected to trace with a finger on a touchscreen, or trace with a cursor directed by a touchpad, trackball, or mouse, according to particular input devices 164 of the digital device. The user traces 212 the shape, during which tracing data is recorded. The digital device interrogates 214 the bracelet for motion data representing motion of the bracelet; the motion data may be accelerometer data, and in an embodiment a combination of accelerometer and gyroscope data, or motion characteristic data derived by categorizing and classifying accelerometer data. This motion data is radioed to the digital device. In an embodiment, motion characteristic data includes peak acceleration in time intervals and times of accelerations; the accelerations correspond to the minute jerk of a user's wrist associated with each keystroke or hand gesture. The user identification is then verified by correlating 216 motion data from the bracelet to motion data to the tracing data. Should the motion data from bracelet correlate with tracing data, access is authorized 218 and user identity during the access is established 220 as the user wearing the bracelet. Should the motion data from the bracelet fail to correlate with tracing data, the access is refused 222.

In an alternative embodiment, the user need not select an authorized user from a list of users with bracelets in range. Instead, the device correlates motion data from all bracelets in range to tracing data, and authorizes the user and bracelet where motion data correlates best to the tracing data; the steps of displaying 206 user selection data and selecting 208 a user are therefore optional.

Figure 5:
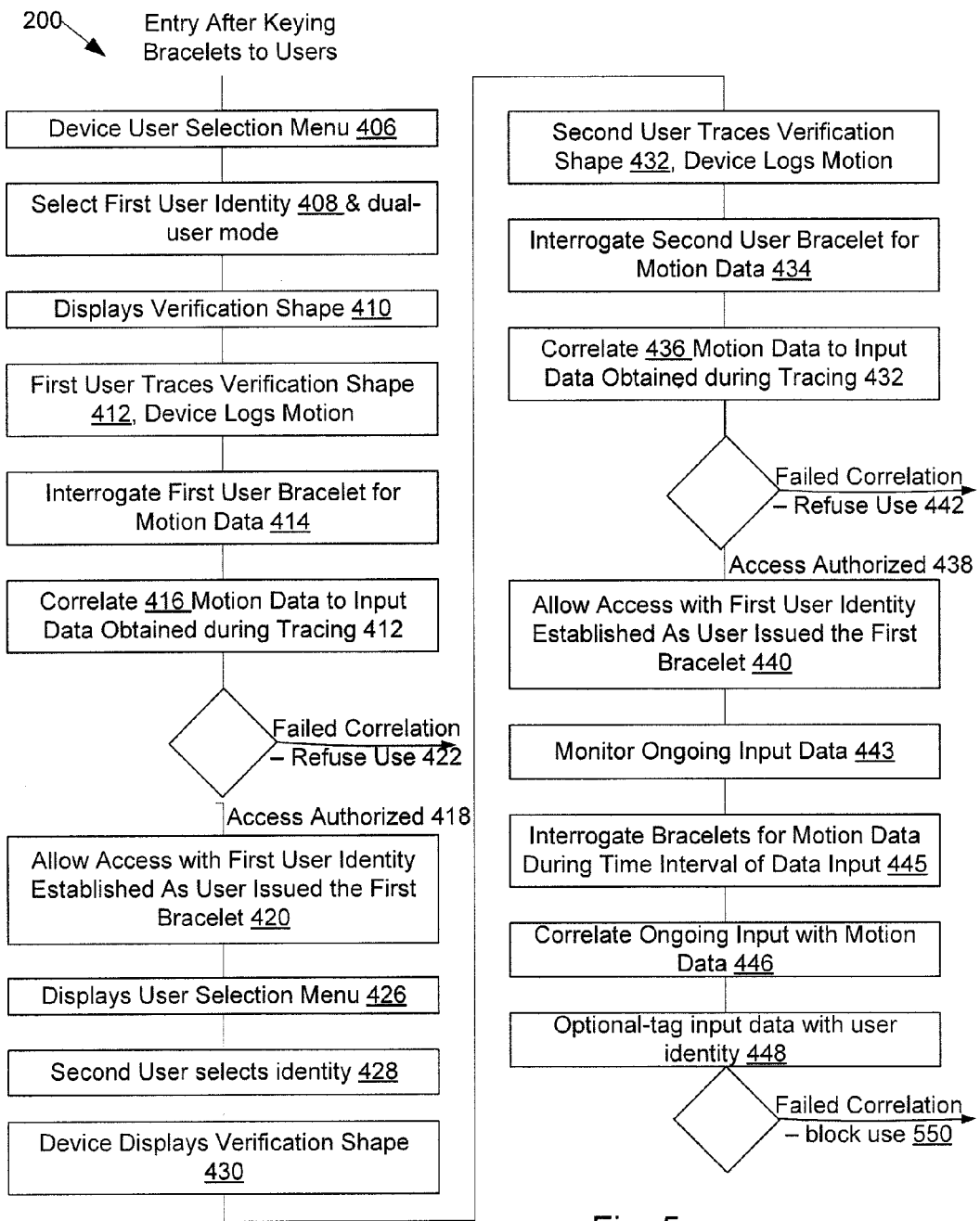
FIG. 5 is a flowchart of an access control protocol for use with two or more bracelets of FIG. 1 and a device of FIG. 2 or system of FIG. 3.

In an alternative embodiment (FIG. 5), where two users are to be authorized to use a single device, such as for training purposes, determination of a particular user from potential users in range is performed by having the digital device display 406 an initial screen that lists authorized users associated with bracelets in digital near-field radio range, and the first user selects 408 himself from the list and checks a dual-user mode-selection box. A second screen is displayed 410 having a shape, such as a triangle or polygon, that the user is expected to trace with a finger on a touchscreen, or trace with a cursor directed by a touchpad, trackball, or mouse, according to particular input devices 164 of the digital device. The user traces 412 the shape, during which tracing data is recorded. The digital device interrogates 414 the bracelet for motion data representing motion of the bracelet; the motion data may be accelerometer data, and in an embodiment a combination of accelerometer and gyroscope data, or motion characteristic data derived by categorizing and classifying accelerometer data. This motion data is radioed to the digital device, as herein described for a single user. The user identification is then verified by correlating 416 motion data from the bracelet to motion data to the tracing data. Should the motion data from bracelet correlate with tracing data, access is authorized 418 and user identity during the access is established 420 as the user wearing the bracelet. Should the motion data from the bracelet fail to correlate with tracing data, the access is refused 422 for the first user.

The digital device then displays 426 a second user-selection menu that lists authorized users associated with bracelets in digital near-field radio range, with the first user excluded, and the second user selects 428 himself from the menu. A second shape-tracing screen is displayed 430 having a shape, similar to that used 410 to verify the first user, that the user is expected to trace with a finger on a touchscreen, or trace with a cursor directed by a touchpad, trackball, or mouse, according to particular input devices 164 of the digital device. The user traces 432 the shape, during which tracing data is recorded. The digital device interrogates 434 the second user's bracelet for motion data representing motion of the bracelet, the motion data being of a type as used 414 for the first user. The user identification, and linkage to his bracelet, is then verified by correlating 436 motion data from the bracelet to the tracing data. Should the motion data from bracelet correlate with tracing data, access is authorized 438 for the second user as well as the first user, and user identity during the access is established 440 as both users wearing the identified bracelets. Should the motion data from the bracelet fail to correlate with tracing data, the access is refused 442. In embodiments, the digital device continues to monitor 443 input as it is received from keyboard, mouse, touchscreen, or similar input devices, and interrogates 445 both the first and second user's bracelets for motion data during time intervals corresponding to when data was entered. The data input 443 is correlated 446 to the motion data 445 to determine which of the identified 440, 420, users entered that data, and the inputs received may optionally be tagged 448 with the user identity. Should the data input 443 fail to correlate to the motion data recorded by either the first or second user's bracelets, a mismatch is declared and use is blocked 450, under an assumption that a third party provided the input, until the users successfully re-authenticate.

In alternative embodiments, the security feature of verifying data obtained from each user tracing a shape against a database of prior tracing data for those users is omitted. In this embodiment, the users need merely pick themselves from the menu of nearby keyed bracelets.

Once access is established 220, ongoing user input is continuously tracked 223 at the input device 164. Periodically, the bracelet associated with the user is interrogated 224 for motion data during an interval where input was received. The motion data is correlated 226 with the tracked input, and if a mismatch between input data and bracelet motion data is detected 228, the digital device is locked 230.

A system, such as an electronic medical records database system, using the herein-described, bracelet-keyed, access system, is illustrated in FIG. 3. The system 300 has a central server 302 or servers, with associated memory systems including an access and security database 304 and the secured data, such as an electronic medical records database 306. A network, preferably an encrypted network 308, connects the server 302 to a security station 310 adapted to issue and authorize bracelets, such as bracelets 320, 322 to users, while charging or storing unissued bracelets 324. The network 308 also connects server 302 to several digital devices 312, 314, 318.

Figure 4:
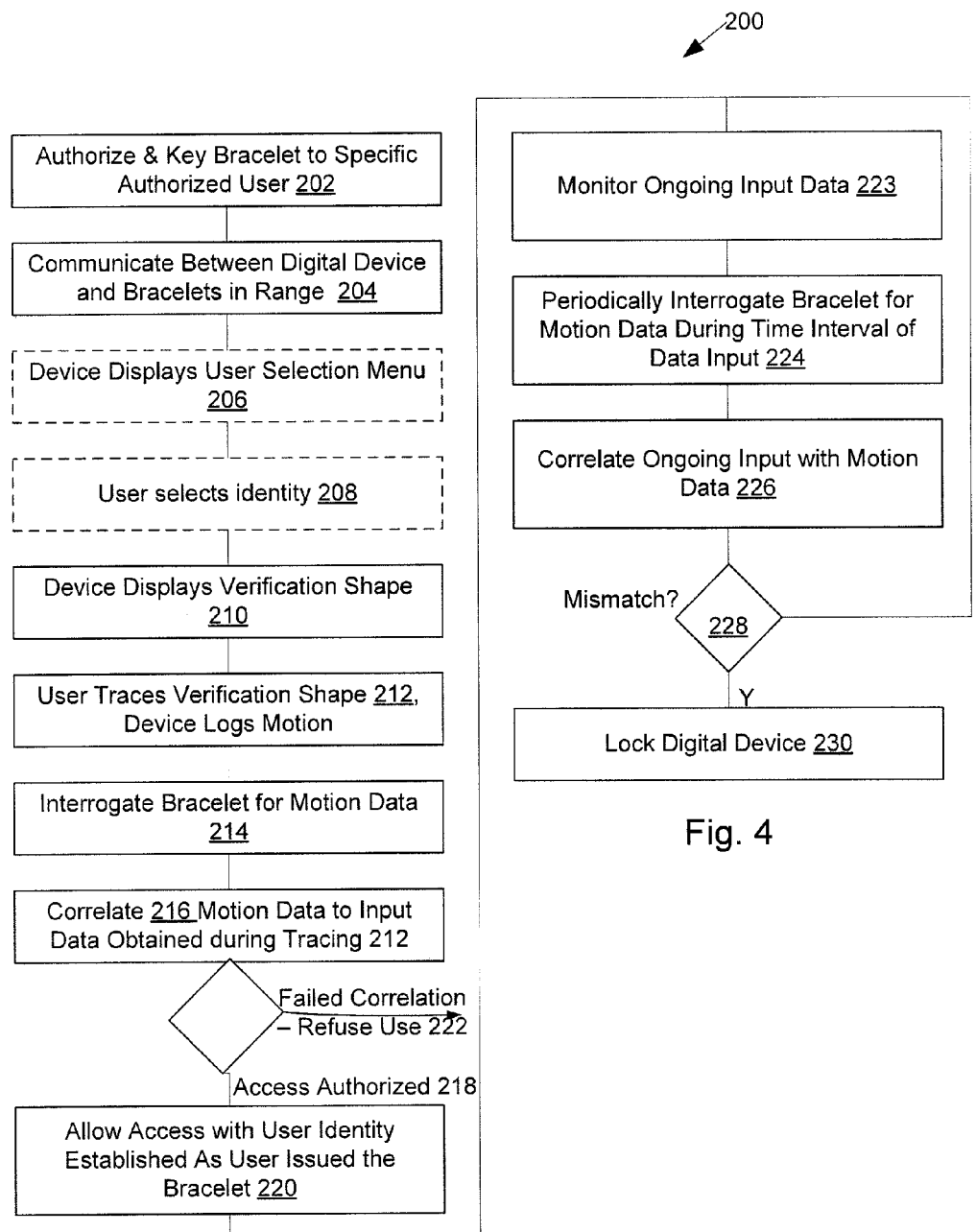
FIG. 4 is a flowchart of an access control protocol for use with the bracelet of FIG. 1 and device of FIG. 2 or system of FIG. 3.

In an alternative embodiment 500 (FIG. 6), some bracelets may be previously issued and keyed 210 to particular users as previously described, while some bracelets may be freshly issued to a user without identifying the user. In this embodiment, a user may be issued 502 an unkeyed bracelet. The device detects 504 any bracelets within range of its near-field radio, and provides 506 a user selection menu. This user selection menu includes both user names (or other identifiers) of users associated with keyed bracelets within range, and, if any bracelet within range is unkeyed, an additional selection option which may be labeled "other" or "unkeyed". If 510 a user selects 508 a name or identifier of a user already associated with a nearby bracelet, operation continues as previously described with display of a verification shape 410, 210 (FIG. 4, 5). If the user selects "other" or "unkeyed", an alternate login screen is displayed 512, which typically includes traditional authentication fields such as a username and password. Once the user logs in 514, providing a username, the verification shape is displayed 516, and the user traces 518 the shape with finger on touchscreen, mouse, or other suitable input device. The device logs 520 input, including timing of input, during the tracing. The device then interrogates any nearby bracelets for motion data 524, and correlates 526 the logged 520 input with motion data 524 to determine which, if any, nearby bracelet recorded motions consistent with the user tracing the verification shape. The nearby bracelet having motion data matching the input is thenceforth identified 528 as belonging to the user with the previously given username. In some embodiments, the motions recorded by the bracelet during the tracing are then correlated against any motions previously recorded for that user and stored in a user-characteristic database 172 (FIG. 2) to verify the user identification. The nearby bracelet identified 528 as belonging to user username is then keyed 532 to user with the username entered at login 514. In an alternative embodiment, the user is prompted for authorization to key the bracelet to the user, and keying 532 only occurs if the user enters an affirmative response to the prompt. Once the bracelet is keyed 532, the device verifies continued use by the authenticated user, blocking unauthorized users, and the user may switch to using additional devices in the same system, as herein described for other embodiments.

Figure 6:
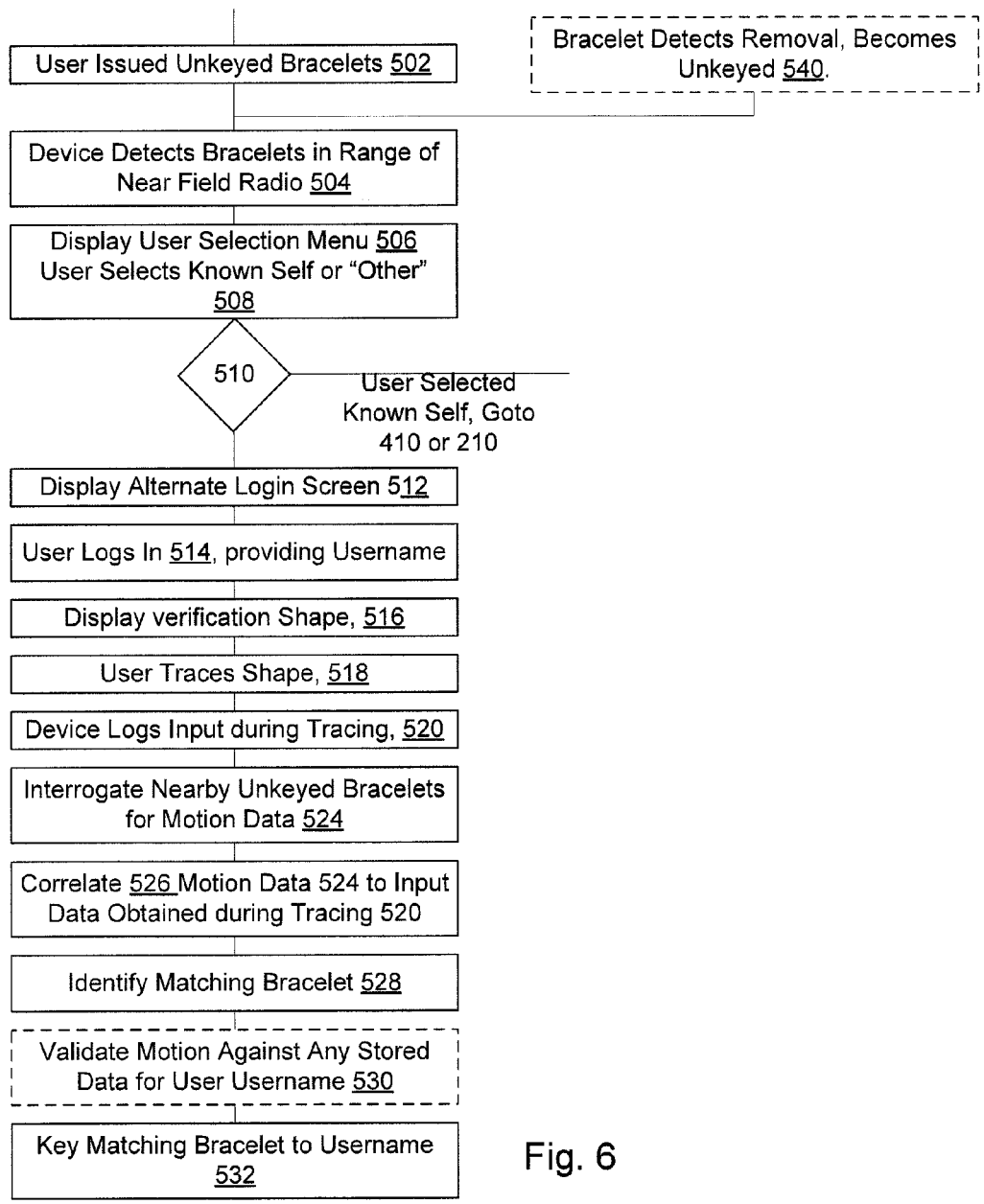
FIG. 6 is a flowchart of an access control protocol permitting association of an authentication device to a user by a digital device or workstation.

In an alternative embodiment of the embodiment of FIG. 6, whenever a bracelet detects that it is removed from the user, for example by opening of a clasp sensor 114 (FIG. 1) or through other sensors such as a skin capacitance sensor 127, then the bracelet enters an unkeyed state 540 and must be rekeyed, for example by the process of 504-532, after the user put it back on.

Desires

The process of starting a session on, or gaining access to, a device as a particular known individual user should not require that the user enter a password or any sort of gesture that requires the memorization of unique per-person codes that change for security purposes. The access should be accurate, reliable and secure such that authorized users readily gain access and are correctly identified to the device or system, but access is denied to unauthorized users. The processes of starting a session on a device and maintaining an open session by an authorized user should require minimal or no effort and should integrate with typical workflows; this authentication is achieved by steps 204-220 of the method. An open session should end as soon as someone other than the person that started the session begins to interact with the device, as accomplished by steps 220-230 of the method and an open session on a device should also end after a determined period of inactivity. The access control protocols should not induce excessive computational or communication overhead, and should not unduly impact battery life.

Threat Model

We are primarily concerned with the problem of identifying who, of users authorized to use a device, is interacting with it, and recognizing authorized users. We assume that communication of a device with other devices on a network is secured by other means such as use of an encrypted wireless protocol.

Thus, we consider three types of attackers:

(1) an individual who is authorized to use the device but wishes to masquerade as another authorized user;

(2) a non-authorized user who either attempts to take advantage of an already open session on a device that is left unattended or who attempts to start a session on device by interacting with the device in the proximity of an authorized user without her knowledge; and (3) a non-authorized user who attempts to use the device in the absence of an authorized user.

Privacy of the user who is interacting with a device or the list of individuals who are authorized to use the device are provided by other systems as known in the security art. 'Denial of service' attacks are not considered herein.

Access Control

This approach allows an authorized user to start a session on a digital device such as a tablet, smartphone, laptop, or desktop. The session remains open for as long as the interactions detected by the device (via the touchscreen, mouse, or keyboard) match accelerometer data from the bracelet worn by the user as described with reference to FIGS. 1-4. We discuss how to extend this approach to smartphones, laptops, or desktops, and for smartphones, laptops, or desktops associated with a larger system such as a hospital electronic medical record system.

Starting a Session

An individual wearing his keyed and issued bracelet on his dominant wrist or arm approaches his tablet, desktop computer, or other digital device to start a session. When the individual presses the home button on the tablet, his bracelet radio and the tablet engage in a start-session protocol. During the start-session protocol, the tablet determines whether or not the interaction sensed on the touch screen matches data sensed by an accelerometer in the individual's bracelet. The tablet, or other digital device, also contacts an access-control database to determine if the bracelet is a legitimate bracelet for this particular system and to determine if the bracelet is keyed to a particular user, and fetches any associated user identification and login limitations from the database to determine if the individual is an authorized user and to determine a level of access to grant to the device.

This process of starting a session on the device is similar to existing password-less unlocking procedures on smartphones and tablets. In one such approach, an individual presses a button followed by a gesture, such as swiping horizontally. Our approach differs in two ways:

(1) When the individual presses a button (e.g. the home button), the device displays a screen with a set of individuals authorized to use the tablet and wearing bracelets within range of the device.

(2) After the individual selects her name from the list, he is presented with a shape on the screen that he is asked to follow with his finger.

Maintaining an Open Session

After an individual starts a session on his tablet using her bracelet, the session remains open for as long as the tablet affirmatively matches the accelerometer data from that bracelet (the interacting bracelet) with the interaction that is sensed through the touch screen. When a gesture is detected by the tablet via the touch screen, the tablet will request that the interacting bracelet send accelerometer data for a pre-determined interval that would correspond to a duration of the observed gesture on the tablet.

Protocols

Start-Session Protocol

In an embodiment, a tablet T and a previously paired bracelet B participate in the start-session protocol in five steps (scan, select, sense, retrieve, and match). In the scan step, the tablet determines which bracelets are in range, and hence in the vicinity, of the tablet; in the select step, the individual chooses her identity from the screen; in the sense step, the tablet and bracelet sense the interaction; in the retrieve step, the tablet retrieves accelerometer data from the bracelet corresponding to the interaction; and in the match step, the tablet attempts to match data from both the tablet and the bracelet corresponding to the interaction to determine the likelihood that the same hand produced both.

1. Scan. When the user presses the home button on a locked tablet, the tablet executes the bracelet discovery function that scans the area for bracelets. The implementation of this function depends on the wireless platform that is used.

In an embodiment using Bluetooth for short range radio 110, Bluetooth 4.0 facilitates the implementation of presence detection by using the advertising mode of operation defined in the Link Layer. In embodiments using ANT+, ANT+ provides proximity pairing as basic functionality (ANT+ is a short-range wireless networking technology described at http://www.thisisant.com). The bracelet discovery function returns a list of bracelet IDs that the tablet associates with a user identity using a local or networked database. The display on the tablet shows the list of user identities sorted by proximity or most recent use, for example.

2. Select. The user selects her identity from the list. The tablet T sends a message to B, the bracelet associated with the individual selected. T requests that B start sensing accelerometer data.

3. Sense. When the bracelet B receives the start-sensing message, B starts sensing motion data including accelerometer data, and in embodiments having a gyro, angle-change data. The tablet T selects a shape at random, from a library of shapes; in a particular embodiment ten shapes are provided. Tablet T then presents the selected shape on the screen and instructs the user to follow the shape with her finger. T captures the associated gesture on the touch screen, logging associated motion.

4. Retrieve. When T senses that the gesture has been performed, T retrieves the corresponding accelerometer data from the bracelet by sending a message to B. B returns movement data corresponding to the time during which the gesture was performed.

5. Match. Finally, T attempts to match the received movement data (including data from or derived from the accelerometer) and starts the session if they match. When the data do not match, T displays an error message and does not start the session.

To improve user experience, the system may simplify re-authentication when a tablet senses resumed interaction shortly after it terminates a session (e.g., for less than a few minutes). The tablet will first attempt to correlate the gestures sensed on the touchscreen with the most recent interacting bracelet rather than prompting the user to select her identity on the screen. In an embodiment, a re-authentication gesture consists of two or three arbitrary taps on the touch screen to restart the session. If the tablet fails to obtain matching accelerometer data from the most recent interacting bracelet, then the tablet remains locked and the start-session protocol begins.

Protocol to Maintain an Open Session

During an open session, T and B perform three steps similar to the start-session protocol (sense, retrieve, and match) and an additional step (decide) to maintain the session open while the user uses the digital device in a normal manner. The protocol does not require communication for periods with no touch screen activity, and we minimize the number of requests when multiple gestures occur in a short period of time by performing periodic authentication.

1. Sense. This sense step differs slightly from the sense step in the start-session protocol. Because multiple gestures may happen in a short period of time—e.g., when an individual is using a virtual keyboard—we chose to require that T retrieve accelerometer data from B corresponding to short interactions rather than single gestures. Short interactions are a set of taps or gestures performed within an interval of time. The tablet T keeps track of the time t when a short interaction G starts and measures the time that a short interaction lasts. We denote duration (G), the time elapsed during G.

2. Retrieve. For each such short interaction G, T requests motion data from B for duration (G) corresponding to the last interaction.

3. Match. T attempts to match logged touchscreen or mouse movement during the interaction G with the motion data retrieved from the bracelet B.

4. Decide. When the touchscreen or mouse data match motion data, the session remains open. If the process of retrieving the data and performing the matching takes excessive time, T locks. However, when they do not match, T performs a filtering step to allow for some mismatches because less aggressive session termination could improve user experience; if mismatches exceed a threshold it is assumed that the session has been pirated and T locks.

Some mismatches may occur even when the user is legitimately interacting with the tablet; for example when he performs taps or gestures with her non-dominant hand or when the match algorithm simply fails to correctly match.

Method

Recall that we unlock a device and do continuous authentication by correlating the accelerometer signal from an individual's bracelet with the input events that he generates as he interacts with a digital devices. The accelerometer signal is a series of instantaneous acceleration values along x-, y-, and z-axes, and may in some embodiments be directly transmitted by the bracelet to the digital device, and in other embodiments feature extraction is performed in the bracelet and extracted features are transmitted to the digital device. The interactions with a digital device are divided into specific 'actions' such as typing, mouse-scrolling, moving-hand-from-keyboard-to-mouse, tap, short-swipe, long-swipe, depending on the digital device. A classifier model is trained to classify given acceleration signal into one of these actions, and the correlation is performed between the classifier's predicted set of actions and actual set of interactions performed by the user.

For Desktop and Laptop Computers

Figure 7:
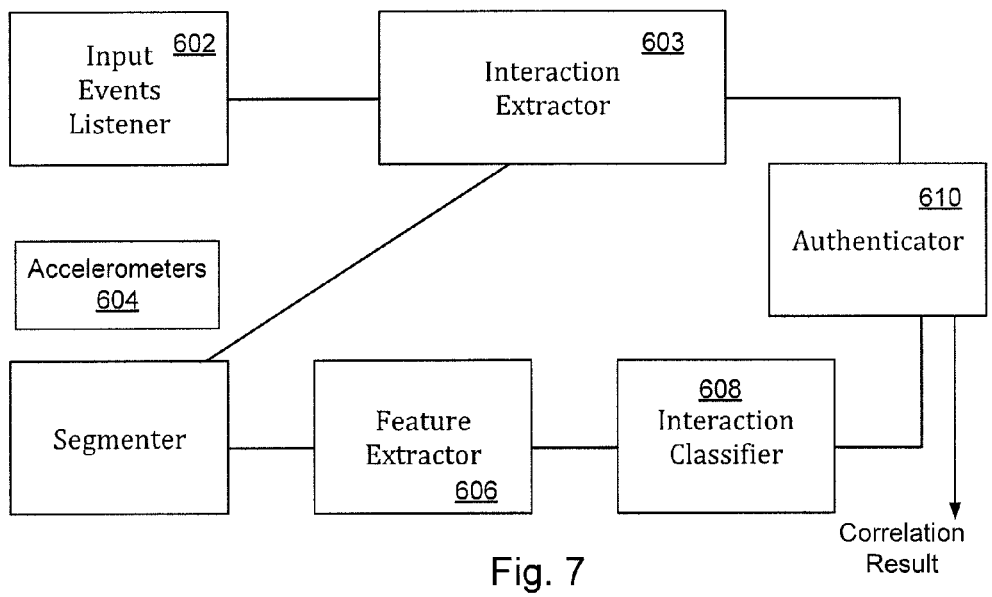
FIG. 7 is a dataflow block diagram of feature extraction in an embodiment.

FIG. 7 shows the dataflow architecture illustrating how this method works for desktops.

The input events listener 602 in a digital device captures the inputs that the user provides, typically through a keyboard and mouse or touchpad, and an interaction extractor 603 creates a sequence of interactions, $S_1$ which is of the form:

$$S_1 = \{(I_0, t_0, t_1), (I_1, t_2, t_3), \ldots\}$$

where $I_0$ is the interaction type, $t_0$ and $t_1$ are the start and end time of the interaction $I_0$. We define certain types of interactions to capture certain pattern of users' wrist movement from data gathered through the accelerometers 604 in the bracelet when they provide input to a desktop through keyboard and mouse or touchpad. Examples of interactions include such 'typing', 'scrolling', 'moving hand from mouse to keyboard or keyboard to mouse/touchpad', 'clicking mouse/touchpad', and 'dragging cursor with mouse or touchpad'.

Figure 8:
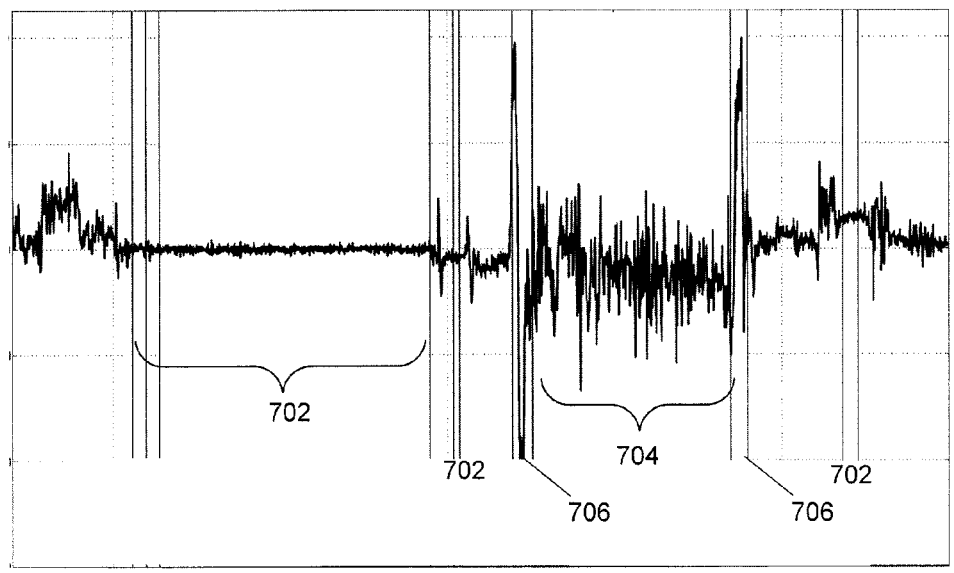
FIG. 8 is a waveform diagram of accelerometer readings at the wrist during selected forms of manual data input such as typing and scrolling.

Data from the accelerometer in the authentication device is of the form:

$$A_s = \{(t_0, x_0, y_0, z_0), (t_1, x_1, y_1, z_1), \ldots\}$$

where $(x_i, y_i, z_i)$ is the instantaneous acceleration along x-, y-, and z-axes, with respect to gravity, at time $t_i$. Example data from accelerometers is shown in FIG. 8, including periods of scrolling 702 and typing using a keyboard 704, and movement between mouse and keyboard 706.

Based on the start and end time of each interaction type $I_i$, corresponding accelerometer data is extracted from $A_s$ by the Segmentor, and the segmented accelerometer data, $A_i$ is provided to the 'Feature extractor' 606 which computers a feature vector $F_i$ using mean, median, variance, standard-deviation, median absolute deviation, inter-quartile range (IQR), power, energy, peak-to-peak amplitude, auto-correlation, kurtosis, and skew over the instantaneous acceleration values or their magnitude in the provided accelerometer data segment. The magnitude of instantaneous accelerations $(x_i, y_i, z_i)$ is defined as:

$$m = \sqrt{(x_i, y_i, z_i)}$$

This feature vector $F_i$ is sent to the 'interaction classifier', which predicts that accelerometer data segment $A_i$ is of interaction type $I'_i$. Thus, the classifier gives a sequence of interactions of the form:

$$S_2 = \{(I'_0, t_0, t_1), (I'_1, t_2, t_3), \ldots\}$$

The classifier 608 is trained with the interactions for a desktop and installed in the digital device. The classifier is not trained for any specific user.

The 'Authenticator' 610 correlates the two sequences $S_1$ and $S_2$. If the two sequences match above a certain predefined threshold, the user is authenticated; otherwise user is denied access.

In addition to the above described method we will correlate mouse inputs with the accelerometer data as follows: inputs from the mouse are of the form:

$$M = \{(t_0, x_0, y_0, c_0, s_0), (t_1, x_1, y_1, c_1, s_1), \ldots\}$$

where $(x_i, y_i)$ represent the mouse pointer location on the screen at time $t_i$ and $c_i = \{0, 1\}$ indicates whether the mouse button is clicked and $s_i = \{0, 1\}$ indicates whether the mouse is being scrolled. Thus, based on the x and y coordinates and time we can capture the trajectory, speed, and acceleration is which the mouse is being moved. We will correlate this information with the acceleration of the wrist, velocity of the wrist (generated by integrating acceleration values from the bracelet), and the wrist displacement (generated by integrating the velocity of the bracelet).

We will also correlate the typing speed and timing of the keystrokes with the energy of the accelerometer data and the peaks in the accelerometer signal. The intuition behind this correlation is that when a user types quickly, his wrist moves, albeit less, but quickly, giving distinct energy pattern than a user who types slowly. Also when a user press a key a small acceleration signal is experienced at the bracelet, and we can identify the user as the one providing keyboard inputs by correlating the timing of the keystrokes with the peaks in the acceleration data.

For Tablets

We use a method similar to the one described above (64-70) for desktop and laptop computers except that the type of interactions used with a tablet will be different. Examples of interactions for a tablet are tap, short-swipe long-swipe, and tap-and-hold.

We correlate the length, curvature, velocity, and acceleration of the swipe-interaction with the displacement of the wrist, curvature of the trajectory of the wrist, velocity and acceleration of the wrist. The displacement and curvature of the wrist is calculated by identifying the path of the wrist displacement, which is computed by integrating the acceleration values twice. Velocity of the wrist is computed by integrating the acceleration values once.

We also correlate swipe durations and length with the overall energy of the acceleration signal. The intuition is that a small and slow swipe will result in a small energy in the accelerometer signal, compared to a long and quick swipe.

When an individual taps his finger briefly stops on the screen and then lifts the finger in the air. If the individual's finger had an accelerometer it would register sharp peaks in the acceleration signal for these events. The accelerometer on the wrist bracelet also register these events, but with a weaker signal. We correlate the timing of these taps with timing of peaks in the accelerometer signal.

Our intuition here is that pressure registered on the screen should (roughly) correlate with the magnitude of the acceleration—a harder tap would register more pressure than a gentle tap. We will correlate pressure registered by the touchscreen for every tap with the acceleration of the bracelet.

In alternative embodiments an implementation is not limited to these particular correlation techniques

DISCUSSION

Optimizations to the Start-Session Protocol

Depending on the wireless technology that is used, it is possible to skip the select step in the start-session protocol. For example, ANT+ provides a proximity search feature that could allow system 300 to determine the closest person to a device. Note that this would simplify the starting of a session, but would not allow attackers to open a session without the authorized user's knowledge.

Another optimization could result from combining the select and sense steps in the start-session protocol. For example, the individual could be instructed to select her identity by sliding her identity to the right or dragging it to a specific icon on the screen. The tablet would ask the corresponding bracelet for its accelerometer data in order to match it against the identity selection gesture.

Other Digital Devices

In our first evaluation, we measured how well our approach works when an individual interacts with desktop computers. We expect that our approach could extend to unlock, and continuous authenticate users on laptops, tablets, smartphones and other electronic devices.

However, a considerable number of individuals interact with their smartphone using their thumb and holding the device with the same hand that is interacting with the smartphone. As a result, wrist movements are more subtle with respect to the smartphone. However, in that case, the implementation of our method could place a higher weight on the accelerometer readings of the smartphone and match movement of the smartphone and the bracelet together to determine the extent to which both movements may correspond to the same interaction.

As for laptops, we expect that the approach we used with tablets would work well with a number of laptops using the touchpad or an associated mouse. In particular, one of the most widely used laptops, the MacBook Pro, made by Apple, has a touchpad that accepts input that resembles a touch screen on a tablet. Furthermore, these laptops may also be equipped with accelerometers either built in or attached to the laptop directly through a USB connector that may reinforce the correlation when a user is using the keyboard. The vibrations detected during typing can be correlated with the motion sensed by the bracelet's accelerometer.

Deauthentication

Deauthenticating, or automatically logging a user out of a device or locking a device, ideally happens when the user has stopped interacting with the device, or when the user has moved away from the device. We use a timeout to determine when a user has stopped interacting with the device. It is hard to distinguish between a passive interaction with a device (e.g., reading, listening to audio presentations, watching a video, attending a network-based class) and no interaction with the device, so some undesired deauthentications or logouts may occur. Although our method can tell when the user has walked out of range because the user moves the bracelet beyond range of the short-range radio, we cannot tell when an in-range user has truly stepped aside versus sitting and listening, or watching the screen.

To help overcome this issue, in an embodiment each device tracks tasks running on the device. When the device determines that a video or audio player application is not merely loaded on the device but is actively displaying video or playing audio, or that a digital telephony application is actively receiving audio and/or video, the timeout is extended to reduce the frequency of undesired deauthentications.

Multiple Users at a Workstation

There may be times when it is desirable to have two authorized users using a single tablet or workstation, such as during training. A first user may wish to open a session, and explore to a particular screen that user is having a problem with, then allow a second user to take over and demonstrate proper use of particular screens. Similarly, a first user may demonstrate a problem or need for reconfiguration with a system, and a second user may have to enter a super-user or administrator password to complete an installation or permit reconfiguration. In an embodiment, the first user is at and uses a first workstation or device and the second user uses a second workstation or device running a remote desktop application that allows cursor movement, text entry, and other control on the first workstation or device, and each user is identified and tracked as heretofore described. In another embodiment, each user wears a bracelet keyed to that user as heretofore described, and each bracelet communicates with digital devices in range, including the device, following the protocol described with reference to FIG. 6 above.

Related Work

Passwords are the most common authentication scheme and probably the oldest. Passwords are convenient because users do not have to carry anything, they are intuitive, and efficient to use. However, the plight of passwords is well documented. Strong passwords are hard to remember, and memorable passwords are easy to guess. Organizations often have rules for choosing a password, and, as a result, users often forget their passwords.

Users often write their passwords in their notebooks—or worse, on sticky paper notes. Moreover, there is no reliable and convenient way to de-authenticate users in the password-based authentication systems. Organizations have tried timeouts and proximity sensors for auto de-authentication, but both efforts have failed because they were not reliable.

Proximity-based authentication schemes using a wearable token provide an alternative, but they are not practical in a dense office spaces where multiple users share the same machine. Furthermore, a simple proximity token can tell who is near a device but not who is using it. For instance, a clinician may step away from the device, but remain in the proximity range, and some other clinician may come and use the device without closing an existing session. When there is a group of clinicians near a device, whom should the device authenticate? Another common scenario where proximity fails is during patient rounds, where a group of doctors, nurses, and medical students interact with the patient's record using one device.

Biometrics are usable and convenient, but they are also not well suited for clinical settings: the presence of gloves, surgical masks, and background noise, make fingerprints, facial recognition, and voice recognition impractical.

Digital device use in clinical settings differ from normal single-user device usage in three important ways: devices are shared; there is no one notion of session on a device—clinicians alternate between device tasks and non-device tasks often, quickly, and erratically; and clinicians have to log into devices to access patient records.

Combinations

The method and system herein described permit a wearable authentication device to become associated with a user in at least one method including an association performed by a security station, which may include biometric verification of user identity; or by an association determined by a digital device into which the user logs in with another user identification method such as a userid and password. Once the authentication device is associated with a user known herein as the wearer, and the user begins using a particular digital device, the device repeatedly or continuously verifies that the wearer is the person using the digital device as described in the method designated A below, or as one of the methods described in the following paragraphs.

Throughout this document, the term "touchpad" refers to a device capable of providing a sequence of coordinates of a second object touching it, whether the second object is a finger or a stylus, and whether it operated by sensing capacitance, through ultrasound, or in another manner, and includes devices known as trackpads. The term is intended to include the finger-tracking surface of most current-production notebook and laptop computers, irrespective of how those surfaces operate.

A method designated A for authenticating and continuously verifying an authorized user of a digital device includes attaching an authentication device to an arm or wrist of the authorized user, the authentication device including at least one accelerometer, a digital radio; and a processor configured to provide authentication device identity information over the digital radio, and to transmit encrypted motion data comprising data selected from the group consisting of data including readings from the at least one accelerometer, and motion characteristic data derived from readings from the at least one accelerometer; receiving and verifying the identity information transmitted by the authentication device as an identity associated with an authorized user; detecting input at an input apparatus selected from the group consisting of a touchscreen, touchpad, mouse, and a keyboard of the digital device; correlating the detected input with the encrypted motion data to the detected input; and permitting access to the digital device if the detected input and the encrypted motion data correlate, and disallowing access if the detected input and the encrypted motion data fail to correlate.

A method designated AA including the method designated A further includes after permitting access, periodically updating the encrypted motion data and the detected input, correlating the detected input and encrypted motion data and disallowing access when no further detected motion data is received for a predetermined timeout period of time or when the detected motion data fails to correlate with the detected input.

A method designated AB including the method designated A or AA wherein the authentication device further comprises a gyroscope sensor, and wherein the motion data further comprises gyroscope data.

A method designated AC including the method designated A, AA, or AB wherein the authentication device further includes at least biometric-identification apparatus.

The method designated AD including the method designated AC wherein the biometric identification apparatus is selected from the group consisting of a fingerprint sensor, and a bioimpedance sensor.

A method designated AE including the method designated A, AA, AB, AC, or AD wherein the authentication device is provided to a user by a security station after the security station verifies the person's identity.

A method designated AG including the method designated A, AA, AB, AC, or AD, and further including associating the authentication device to the authorized user by allowing the authorized user to provide authentication information; verifying the authentication information; allowing the authorized user to provide a reference input to the digital device; determining a particular authentication device sensed motion data corresponding to the reference input; and associating the particular authentication device to the authorized user.

A system designated B includes an authentication device adapted to be attached to an arm or wrist of an authorized user, the authentication device including at at least one accelerometer; a digital radio; and a processor configured to provide authentication device identity information over the digital radio, and to transmit motion data comprising data selected from the group consisting of data including readings from the at least one accelerometer, and motion characteristic data derived from readings from the at least one accelerometer. The system also includes a digital device including a digital radio adapted to communicate with the digital radio of the authentication device; at least one input device selected from the group consisting of a touchscreen, a touchpad, a mouse, a trackball, and a keyboard, the input device adapted to record an input entered by a user; and at least one processor and at least one memory. The memory includes firmware comprising machine readable instructions adapted to correlate motion data received by the digital radio of the digital device from the authentication device with recorded input entered by the user, and to disallow access to the digital device if correlation fails.

A system designated BA including the system designated B further comprising a server with an access-control database, the server being in communication with the digital device, and the firmware of the device further comprises firmware to verify authentication device identity information received through the device's digital radio from the authentication device, and to identify a particular user from the authentication device identity information.

A system designated BB including the system designated BA or B wherein the firmware of the digital device further comprises firmware to correlate the motion data with motion data stored in the access-control database to verify identity of the particular user.

A system designated BC including the system designated B, BB, or BA, wherein the firmware of the digital device further comprises firmware to key an unkeyed authentication device to a particular user when the user provides alternative login information to the digital device.

A system designated BD including the system designated B, BA, BB, or BC, wherein the firmware of the digital device further comprises timeout firmware to discontinue access by a user after a predetermined timeout interval elapses from user input to the digital device.

A system designated BE including the system designated BD, wherein the firmware of the digital device further comprises firmware to detect an active application selected from the group consisting of an audio player, a video player, and a voice-over-IP application, and to extend the predetermined timeout interval upon detection of the active application.

Changes may be made in the above methods and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

We claim:

1. A method for authenticating and continuously verifying an authorized user of a digital device comprising:
    attaching an authentication device to an arm or wrist of the authorized user, the authentication device comprising:
        at least one accelerometer;
        a digital radio; and
        a processor configured to provide identity information associated with the authentication device over the digital radio, and to transmit motion data, the motion data comprising data selected from the group consisting of data including readings from the at least one accelerometer, and motion characteristic data derived from readings from the at least one accelerometer;
    receiving and verifying identity information associated with the authorized user transmitted by the authentication device;
    receiving a received input from an input apparatus selected from the group consisting of a touchscreen, touchpad, mouse, and a keyboard of the digital device;
    receiving and recording the motion data during time intervals when the received input was entered;
    authenticating the authorized user and verifying the authentication device is attached to the arm or wrist of the authorized user by correlating the received input with the motion data recorded during time intervals when the received input was entered; and
    permitting access to the digital device after a successful authentication.

2. The method of claim 1 further comprising:
    after successfully authenticating the user, periodically updating the motion data as updated motion data and the received input as updated received input, correlating the received input and motion data and disallowing access when no updated motion data is received for a predetermined timeout period of time or when the updated motion data fails to correlate with the updated received input.

3. The method of claim 1 wherein the authentication device further comprises a gyroscope sensor, and wherein the motion data further comprises gyroscope data.

4. The method of claim 1 wherein the authentication device further includes at least biometric-identification apparatus.

5. The method of claim 4 wherein the biometric identification apparatus is selected from the group consisting of a fingerprint sensor and a bioimpedance sensor.

6. The method of claim 3 further comprising:
    after permitting access, periodically updating the motion data and the received input, correlating the received input and motion data and disallowing access when no further detected motion data is received for a predetermined timeout period of time or when the detected motion data fails to correlate with the received input.

7. The method of claim 1 wherein the authentication device is provided to the authorized user by a security station after verifying the authorized user's identity.

8. The method of claim 2 wherein the authentication device is provided to the authorized user by a security station after the security station verifies the authorized user's identity.

9. The method of claim 1 wherein the motion data is encrypted.

10. A method for authenticating and continuously verifying an authorized user of a digital device comprising:
    providing a plurality of authentication devices each comprising:
        at least one accelerometer,
        a digital radio, and
        a processor configured to provide identity information associated with the authentication device over the digital radio, and to transmit motion data, the motion data comprising data selected from the group consisting of data comprising readings from the at least one accelerometer and motion characteristic data derived from readings from the at least one accelerometer;
    allowing the authorized user to provide authentication information;
    verifying the authentication information;
    allowing the authorized user to provide a reference input to the authentication device;
    determining which particular authentication device of the plurality of authentication devices sensed an authentication device-identifying motion data corresponding to the reference input; and
    associating the particular authentication device to the authorized user;

attaching the particular authentication device to an arm or wrist of the authorized user;

receiving and verifying identity information transmitted by the particular authentication device as associated with the authorized user;

receiving a received input at an input apparatus selected from the group consisting of a touchscreen, touchpad, mouse, and a keyboard of the digital device;

correlating the received input with an authentication motion data transmitted by the particular authentication device; and permitting access to the digital device if the received input and the authentication motion data correlate, and disallowing access if the received input and the motion data fail to correlate;

after permitting access, periodically updating the authentication motion data and the received input, correlating the received input and the authentication motion data, and disallowing access when no further authentication motion data is received for a predetermined timeout period of time or when the authentication motion data fails to correlate with the detected input.

11. A system comprising:

at least one authentication device adapted to be attached to an arm or wrist of an authorized user, the authentication device comprising:
  at least one accelerometer;
  a digital radio; and
  a processor configured to provide authentication device identity information over the digital radio, and to transmit motion data over the digital radio, the motion data comprising data selected from the group consisting of data including readings from the at least one accelerometer, and motion characteristic data derived from readings from the at least one accelerometer; and at least one digital device comprising:
  at least one digital radio adapted to communicate with the at least one digital radio of the authentication device;
  at least one input device selected from the group consisting of a touchscreen, a touchpad, a mouse, and a keyboard, the input device adapted to record an input entered by a user;
  at least one processor and at least one memory; and
  a firmware in the memory containing machine readable instructions adapted to correlate motion data received by the digital radio of the digital device with recorded input entered by the user, the motion data corresponding in time to entry of the recorded input, and to disallow access to the digital device if correlation fails.

12. The system of claim 11 further comprising:

a server with a personnel database, the server being in communication with the digital device, and the machine readable instructions of the device further comprise instructions that when executed verify the authentication device identity information and to identify a particular user from the authentication device identity information.

13. The system of claim 12 wherein the firmware of the digital device further comprises firmware to correlate the motion data with motion data stored in the personnel database to verify identity of the particular user.

14. The system of claim 12 wherein the firmware of the digital device further comprises firmware to key an unkeyed authentication device to a particular user identity when the user provides alternative login information to the digital device.

15. The system of claim 12 wherein the firmware of the digital device further comprises timeout firmware to discontinue access by a user after a predetermined timeout interval elapses from user input to the digital device.

16. A system comprising:

at least one authentication device adapted to be attached to an arm or wrist of an authorized user, the authentication device comprising:
  at least one accelerometer;
  a digital radio; and
  a processor configured to provide authentication device identity information over the digital radio, and to transmit motion data over the digital radio, the motion data comprising data selected from the group consisting of data comprising readings from the at least one accelerometer, and motion characteristic data derived from readings from the at least one accelerometer; and at least one digital device comprising:
  at least one digital radio adapted to communicate with the at least one digital radio of the authentication device;
  at least one input device selected from the group consisting of a touchscreen, a touchpad, a mouse, and a keyboard, the input device adapted to receive a received input entered by a user;
  at least one processor and at least one memory;
  machine readable instructions in the at least one memory adapted to correlate motion data received by the digital radio of the digital device with the received input and disallow access to the digital device if correlation fails, machine readable instructions to discontinue access to the digital device after a predetermined timeout interval elapses since a successful correlation, and machine readable instructions adapted to detect an active application selected from the group consisting of an audio player, a video player, and a digital telephony application, and to extend the predetermined timeout interval upon detection of the active application.

* * * * *